(12) United States Patent
Alonso

(10) Patent No.: US 10,127,827 B2
(45) Date of Patent: Nov. 13, 2018

(54) PORTABLE EGRESS TRAINING DEVICE

(71) Applicant: Bolo3 Group, Escondido, CA (US)

(72) Inventor: Armando R. Alonso, Apollo Beach, FL (US)

(*) Notice: Subject to any disclaimer, the term of this patent is extended or adjusted under 35 U.S.C. 154(b) by 169 days.

(21) Appl. No.: 14/720,631

(22) Filed: May 22, 2015

(65) Prior Publication Data

US 2015/0371549 A1 Dec. 24, 2015

Related U.S. Application Data

(60) Provisional application No. 62/002,571, filed on May 23, 2014.

(51) Int. Cl.
| | | |
|---|---|---|
| *G09B 9/04* | (2006.01) | |
| *G09B 9/00* | (2006.01) | |
| *G09B 9/02* | (2006.01) | |
| *G09B 19/00* | (2006.01) | |
| *G09B 19/16* | (2006.01) | |

(52) U.S. Cl.
CPC ............. *G09B 9/00* (2013.01); *G09B 9/02* (2013.01); *G09B 19/00* (2013.01); *G09B 19/16* (2013.01)

(58) Field of Classification Search
USPC ............ 434/29, 30, 62, 66, 68, 219, 226; 440/12.5, 12.62, 12.66
See application file for complete search history.

(56) References Cited

U.S. PATENT DOCUMENTS

| | | | |
|---|---|---|---|
| 2,871,927 A | 2/1959 | Materi | |
| 2,979,016 A | 4/1961 | Rossi | |
| 3,225,458 A | 12/1965 | Glockl | |
| 4,273,544 A * | 6/1981 | Smith | B63B 35/73 440/100 |
| 4,368,998 A * | 1/1983 | Pestoor | A47B 47/0008 403/171 |
| 4,422,685 A | 12/1983 | Bonfilio et al. | |
| 4,677,804 A * | 7/1987 | Holt | E04B 1/1903 403/171 |
| 4,921,369 A * | 5/1990 | Chew, II | A47D 7/002 135/116 |

(Continued)

FOREIGN PATENT DOCUMENTS

| | | | | |
|---|---|---|---|---|
| EP | 1408470 | * | 4/2004 | ............ G09B 19/00 |
| JP | 3743526 B2 | | 2/2006 | |

(Continued)

OTHER PUBLICATIONS

HUET Simulators, Shallow Water Egress Trainer (SWET) SEFtec, 2011.*

(Continued)

*Primary Examiner* — Kurt Fernstrom
(74) *Attorney, Agent, or Firm* — GrayRobinson, P.A.; Michael J. Colitz, III

(57) ABSTRACT

Disclosed is an underwater safety training device. More particularly, the disclosure relates to an egress chair for use in training individuals on how to egress from a submerged vehicle. In accordance with the disclosure, the present egress trainer is lightweight so that it can be manipulated and moved by a single individual. It can also be dissembled for storage and transport. The trainer includes floatable wheel pods that allow the device to float and balance upon the water.

5 Claims, 5 Drawing Sheets

(56) References Cited

U.S. PATENT DOCUMENTS

| | | | | |
|---|---|---|---|---|
| 5,090,105 | A | * | 2/1992 | DeRees ................ B62D 63/025 29/460 |
| 5,536,063 | A | * | 7/1996 | Cable ...................... A47C 4/03 297/16.2 |
| 6,224,159 | B1 | | 5/2001 | Perry |
| 7,537,453 | B2 | * | 5/2009 | Morgan ................. A47B 97/00 434/80 |
| 7,934,963 | B1 | * | 5/2011 | Carambat ............. B60F 3/0007 440/12.51 |
| 8,029,021 | B2 | * | 10/2011 | Leonard .................. B60G 3/20 180/21 |
| 8,240,748 | B2 | * | 8/2012 | Chapman ................ A61G 3/00 296/187.07 |
| 8,758,016 | B1 | | 6/2014 | Henriksson |
| 8,899,986 | B2 | | 12/2014 | Glueck |
| 2006/0046589 | A1 | | 3/2006 | Farley et al. |
| 2010/0019546 | A1 | * | 1/2010 | Stephens ................ B62D 39/00 296/218 |
| 2016/0042655 | A1 | * | 2/2016 | Sweet .................... G09B 23/30 434/267 |

FOREIGN PATENT DOCUMENTS

| | | |
|---|---|---|
| JP | 3743527 B2 | 2/2006 |
| JP | 4272794 B2 | 6/2009 |

OTHER PUBLICATIONS

"Aviation Egress Training Systems—Underwater Egress Training", Jul. 3, 2008 [retrieved online Feb. 24, 2017].*

HUET Simulators, Shallow Water Egress Trainer (SWET) SEFtec, Mar. 16, 2012 [retrieved online Nov. 18, 2017].*

HUET Simulators, Shallow Water Egress Trainer (SWET). [Online]. SEFtec, 2011 [Retrieved on Aug. 1, 2015]. Retrieved from the Internet: <URL:http:www.seftec.ie/HUET-SWET.html>.

* cited by examiner

PORTABLE EGRESS TRAINING DEVICE

CROSS-REFERENCE TO RELATED APPLICATION

This application claims priority to co-pending provisional application 62/002,571 filed on May 23, 2014 and entitled "Modular Shallow Water Egress Trainer." The contents of this co-pending application are fully incorporated herein for all purposes.

TECHNICAL FIELD

This disclosure relates to an egress trainer. More particularly, the present disclosure relates to an egress trainer that is modular, lightweight, and portable and that can be used in shallow water.

BACKGROUND OF THE INVENTION

Egress trainers are known in the art. The generic egress trainer is a chair that floats when placed in the water. The general construction has been in existence since the late 1940's. It was originally designed by the Coast Guard, to train/teach pilots how to use correct procedures to escape from airplane cabins when submerged under water. Some types of egress trainers are known as shallow water egress trainers or "SWET." The SWET chair created very little disorientation, so it was not as effective as it could be for training. Nonetheless, SWET chairs allows students with fear of water, or with low water level comfort, to adjust gradually to the water and the procedures taught for egress from a submerged aircraft cabin.

There are several known SWET chair designs. Some SWET chairs float, while others do not. Those that float are unstable on the surface of the water. Due to its unstable nature, once placed on the water, most instructors hold the chair steady for students to climb onto the seat and prepare for training. This is done for safety reasons. SWET chairs that do not float have a much more limited capability, because the student does not even get the floating sensation that creates realism to any extent. Non-floating SWET chairs can weigh as much as 380-450 lbs. It may take three to six instructors to place the chair into the water or remove it from the water after training. The skeletal structure is heavily constructed, so that heavy doors or exits can be attached to the structure for training. The weight alone makes using it a very difficult, unsafe, evolution for instructors to perform.

Some examples of crash similar are known in the patent literature. For example, U.S. Pat. No. 8,758,016 to Henriksson discloses a vehicle driver and combat situation simulator. The system simulates the complete operation of a vehicle, particularly a military vehicle, and provides an integrated vehicle training environment. U.S. Pat. No. 8,899,986 to Gluck discloses an air rescues simulator that comprises a helicopter passenger cabin that is attached to a crane system. The simulator is designed for instructional and training purposes. U.S. Pat. No. 3,225,458 to Glockl discloses a helicopter training device. The device is designed to be a pilot training device and allow helicopter pilots to have better instruction in the basic maneuvers of rotary winged aircraft.

Although these referenced patents each achieve their own unique and individual objectives, none relates to an egress training device. What is needed, therefore, is a very lightweight egress training device that creates a stable platform, has a modular construction, and that is lightweight and portable. The egress training device of the present disclosure fulfills these and other needs present in the art.

SUMMARY OF THE INVENTION

This present disclosure relates to an egress trainer.

One possible advantage of the egress trainer of the present disclosure is that it is very lightweight while at the same time providing a stable platform.

Yet another advantage of the trainer of the present disclosure is that it employs a modular construction and allows for the attachment of windows, exits, doors, and panels.

Another possible advantage is achieved by providing an egress trainer that is composed of a number of discrete detachable parts, whereby the trainer can be arranged into a number of different configurations.

Another advantage of the trainer of the present disclosure is that it can be broken down for travel.

The egress trainer of the present disclosure can easily be inverted to create a high level of disorientation for the trainee.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

Similar reference numerals refer to similar parts throughout the several views of the drawings.

Parts List

| | |
|---|---|
| Egress Trainer | 10 |
| Cage | 20 |
| Trainee | 22 |
| Seat | 24 |
| Harness | 26 |
| Tubular Components of Cage | 28 |
| Wheels | 32 |
| Modular Components | 34 |
| Windows | 36 |
| Exits | 38 |
| Doors | 42 |
| Panels | 44 |

DETAILED DESCRIPTION OF THE DRAWINGS

The present disclosure relates to a safety training device. More particularly, the disclosure relates to an egress chair for use in training individuals on how to egress from a submerged vehicle. In accordance with the disclosure, the present egress trainer is lightweight so that it can be manipulated and moved by a single individual. It can also be dissembled for storage and transport. The trainer includes floatable wheel pods that allow the device to float and balance upon the water. The various components of the present disclosure, and the manner in which they interrelate, are described in greater detail hereinafter.

Figure 1:
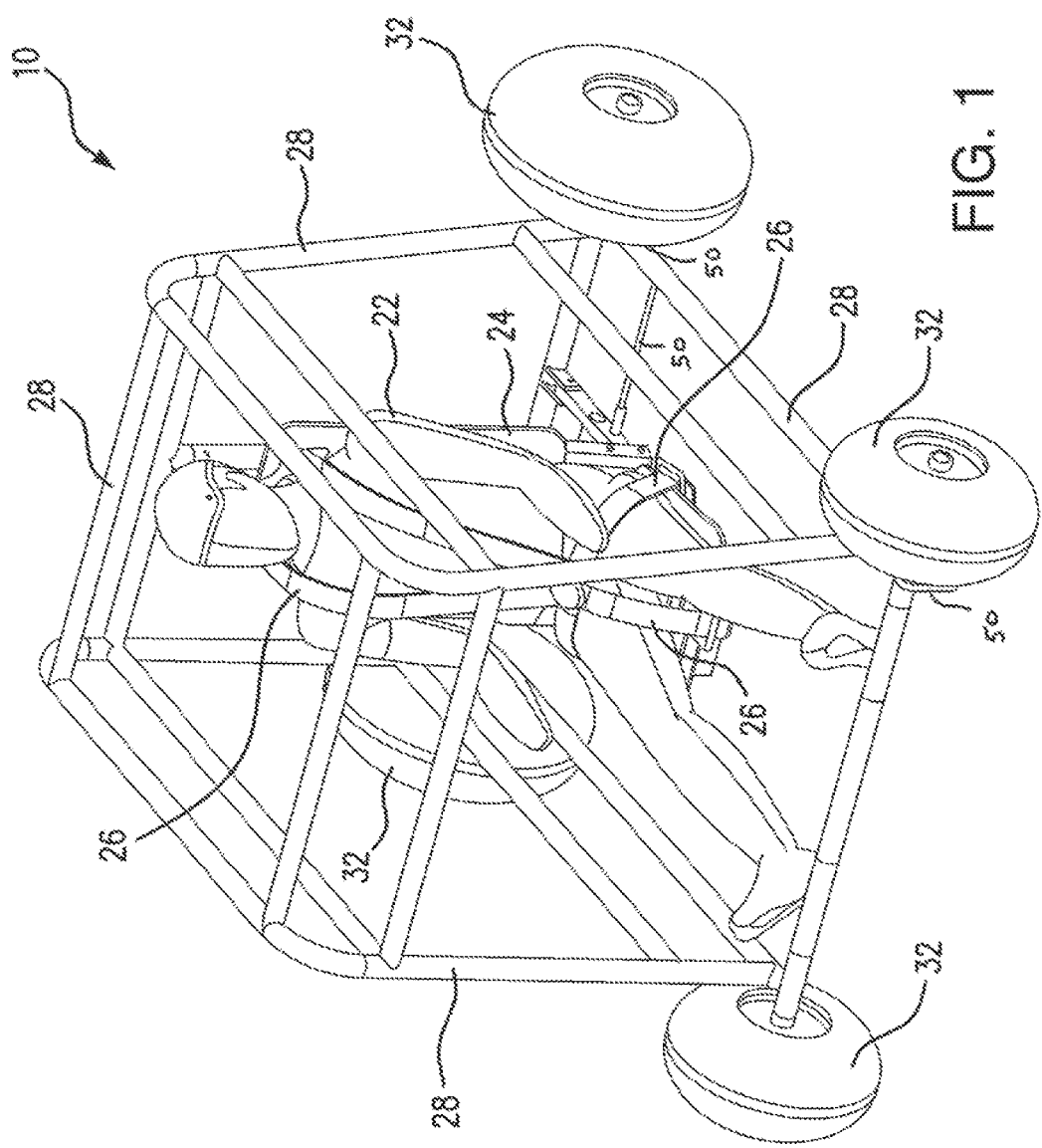
FIG. 1 is a perspective view of the egress trainer of the present disclosure with a seated occupant.
Figure 2:
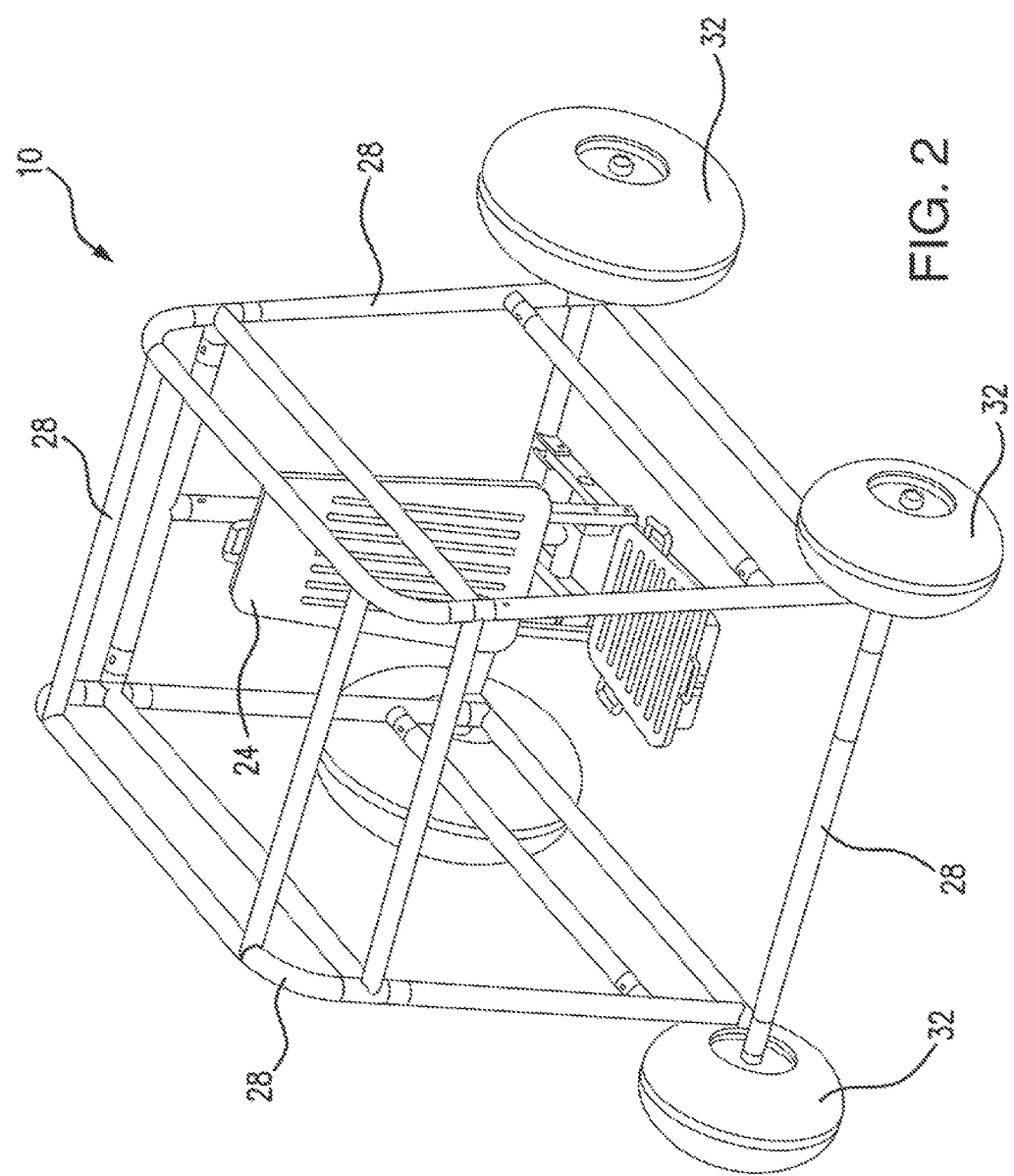
FIG. 2 is a perspective view of the egress trainer of the present disclosure without a seated occupant.
Figure 3:
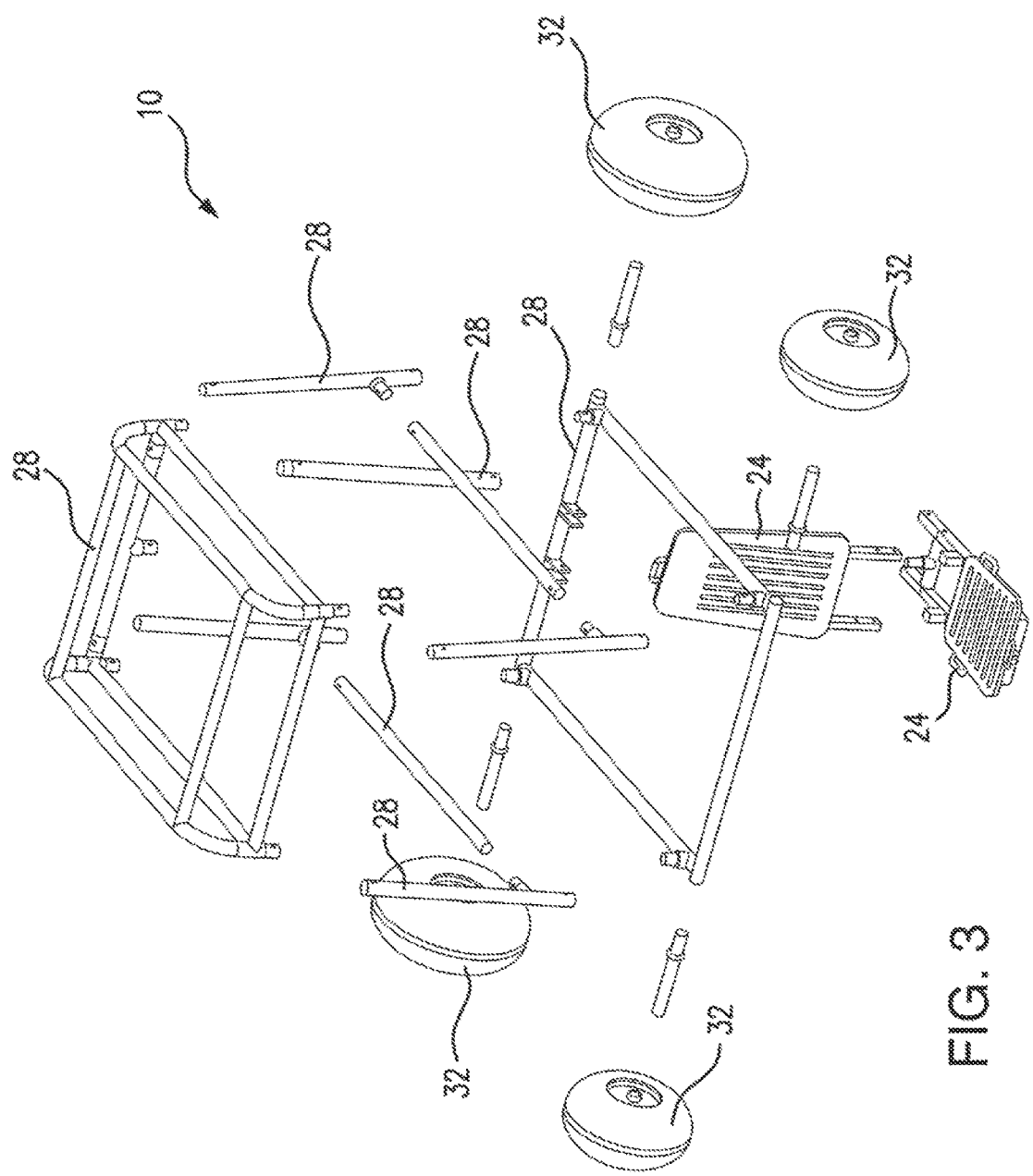
FIG. 3 is an exploded view of the egress trainer of the present disclosure.

FIGS. 1-3 show the various components of one embodiment of the trainer 10 of the present disclosure. It is preferable that trainer 10 is a modular shallow water egress trainer or "MSWET" device. Trainer 10 includes a cage 20 that initially surrounds the seated trainee 22. Trainee 22 sits upon a seat 24 that is positioned within cage 20. A harness 26 is used to secure the trainee 22 within seat 24. In the preferred embodiment, harness 26 is a five-point harness that may be found in a aircraft cockpit. Other harness arrangements may be used as needed to simulate different vehicle cabin environments.

In the embodiment of FIG. 1, cage 20 is formed from interconnected tubular metal components 28. In the preferred embodiment, components 28 are made from marine-grade aluminum. Components 28 are assembled together to form a cage or cockpit around the seated trainee 22. Components 28 can be taken apart to disassemble trailer 10. This allows cage 20 can be dismantled for storage and transport. A carrying case can be provided to hold all of the individual components 28. Ideally, the individual components of trainer 10 are such that it can be carried by one person in the disassembled stated. Buoyant wheels 32 are rotatably positioned at the bottom of cage 20. Wheels 32 allow trainer 10 to be moved by a single instructor over the ground. Wheels 32 are hollow and sufficiently buoyant to allow trainer 10 to float on the surface of the water. Once upon the water, an instructor can invert cage 20 to submerse the trainee 22 and begin the exercise. By inverting the trainer 10, the trainee 22 undergoes the experience of a crash landing in the water. The trainee 22 will thereafter lean to unbuckle himself or herself from harness 26. Trainer 10 may also include an emergency release system 50 to uncouple the trainee 22 in the event they cannot do so themselves. Release system 50 may include a lever or mechanical actuator that allows the instructor to uncouple the trainee 22 from seat 24. It may accomplish this, for example, by releasing the bottom components 28 of cage 20, and thereby, permit the instructor to gain access to the interior of cage 20.

Figure 4:
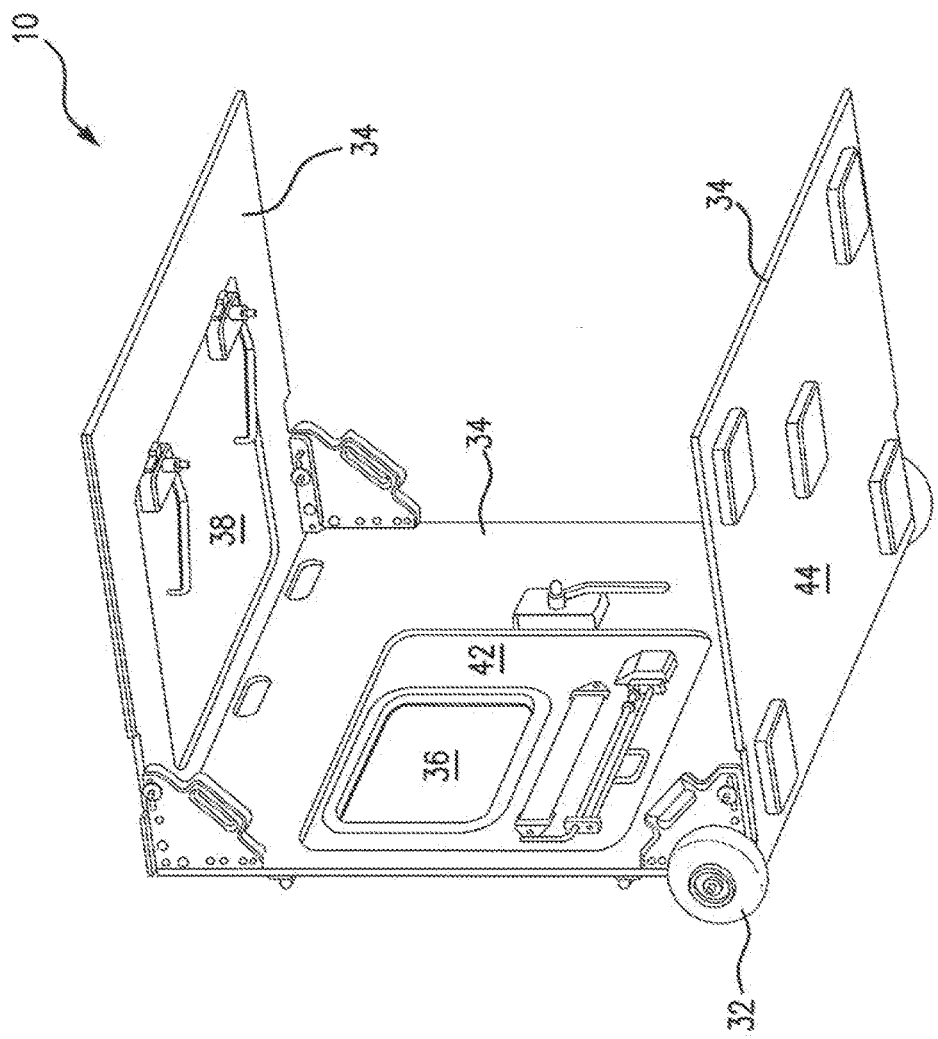
FIG. 4 is a perspective of various modular components of the egress trainer of the present disclosure.
Figure 5:
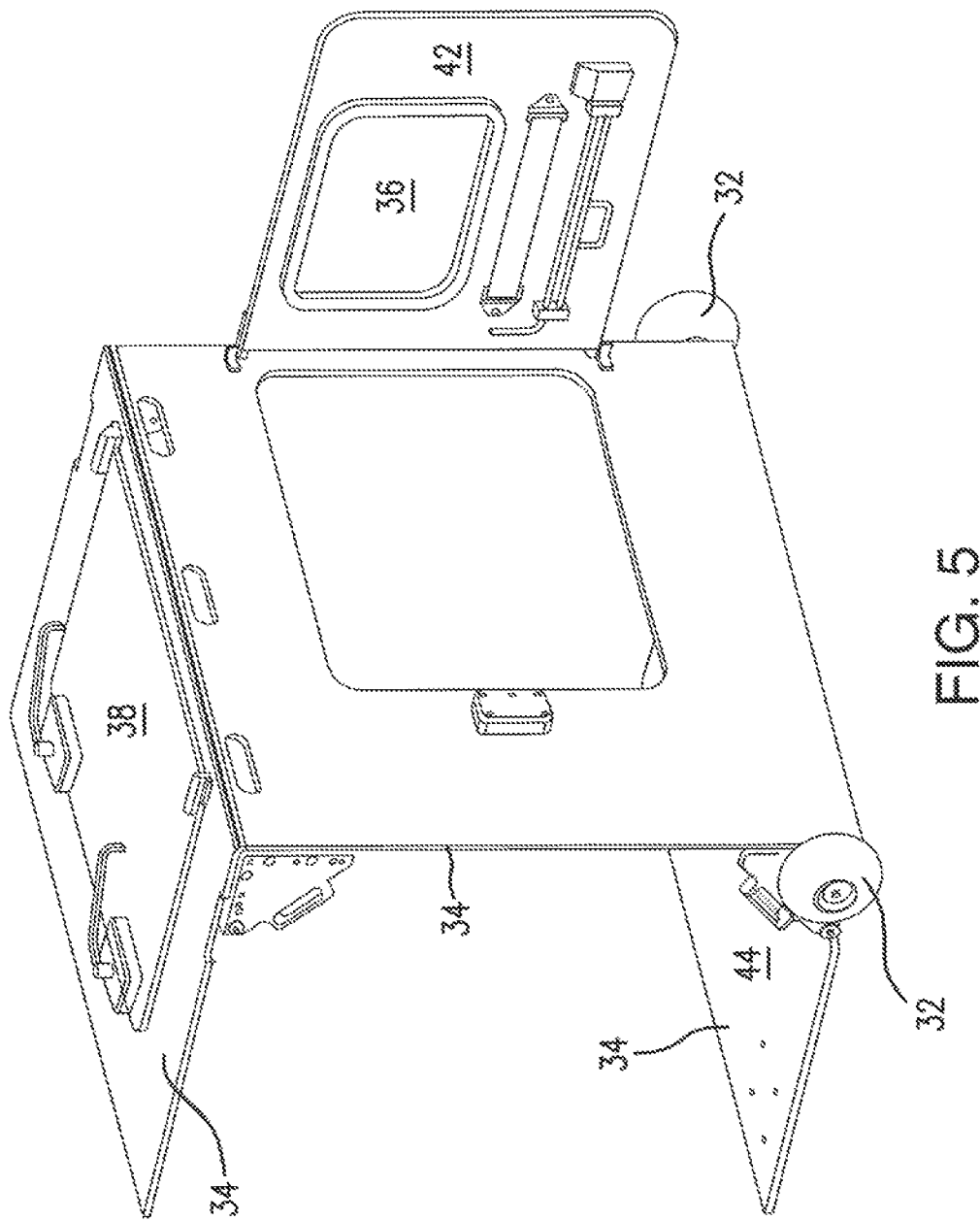
FIG. 5 is a perspective of various modular components of the egress trainer of the present disclosure.

FIGS. 3-4 illustrate a further embodiment of the present disclosure. In this embodiment, the tubular components 28 of trainer 10 have been replaced by modular components 34. Modular components 34 include (but are not limited to): windows 36, exits 38, doors 42, and panels 44. These components 34 can be interconnected together via suitable fasteners in a variety of different configurations. This allows the instructor to assemble the trainer 10 in different ways to simulate a wide variety of vehicle environments. As with the primary embodiment, buoyant wheels 32 are used to support and transport trainer 10. A seat 24 and harness 26 are likewise included to restrain the trainee.

The MSWET chair comes with one generic clear or tinted, push out window/exit, with a handle attached, and one point lap seat belt/harness. The MSWET chair has a lightweight, small, durable and sturdy design. The chair is preferably made of 6061-T6 Marine-Grade Aluminum, making it a durable training simulator in a harsh wet weather environment. It is a strong simulator/platform with incredible ease of use, yet sturdy enough to support a multitude of windows/exits designed for training. In one embodiment, the gross weight of the chair is approximately 97 pounds, and its measurements are 40½" Wide×47" Long, 40" High.

One of the most important characteristics of the chair is its stability. The chair will not capsize on its sides or turn backwards or forward even if the student intentionally tries to do so. A student weighing as much as 350 pounds can sit, unassisted by instructors, and without fear of the chair capsizing on its side, while adjusting his/her seating position, and lock seatbelt/harness in place. Stability allows for reconfiguration at any time with heavy exits, doors and or hatches or a combination of them all. Instructors do not need to have their hands on the chair to maintain stability, thereby conserving energy, and allowing them to focus on instruction/briefing of students. One instructor can turn the chair and student on any of its axes once, or multiple times, creating a high degree of disorientation. The MSWET can be turned right side up in less than two seconds.

The chair includes multiple components that are interchangeably positioned about the structure of the chair. These components can include windows, exits, doors, and panels. All of these components can be assembled in a variety of configurations to simulate different cockpit environments. The window components can be provided in light or dark tint variants. A tinted window is easier/faster to spot/recover from the bottom of the pool once the student has jettisoned it. It also adds to realism of training by reducing ambient light levels. The chair includes push, pull or slide features on the window/exits to add to the familiarity of the simulated cabin. This, in turn, creates better muscle memory during training. Overhead hatches for amphibious assault vehicles (AAV's), Army's Stryker and HWMMV Doors are also available.

The chair can accommodate one, two, three, four or five point seat belt/harnesses. Barrier screens can be fitted/attached to the chair sides or overhead. This enhances reality of training not only by creating the physiological effect that a pilot would find in a closed quarters cabin, but also provides barriers commonly found in a ditching scenario.

The chair is designed to be portable, which allows for the training of personnel in a remote locations, instead of a dedicated training facility. Training can be provided whenever and wherever the trainer can travel.

In one embodiment, the preferred weight of the chair is approximately 97 lbs. Floatable wheels pods allow ease of movement to, and from, any storage location within the training area with relative ease. The chair can be pushed or pulled, launched into the water/pool, as well as recovered after training evolution by one person. The chair can be assembled and disassembled in less than 10 minutes.

The chair is small enough to take as baggage on airplanes. It fits in two duffle bags, each weighing approximately 47 pounds, which can reduce travel expenses by eliminating extra baggage charges. The portability and low weight of the chair alleviates the chance of possible injury that may come from lifting heavy objects, making it extremely safe and easy to handle on the ground, as well as, in the water. The unique buoyancy pods accommodate, with perfect balance, almost any size and weight student. Due to its configuration, one instructor rolling it to the edge of the pool may safely launch or recover the device to /from any training evolution of the day.

Due to its design, the chair can be inverted as fast, and as many times and on any axis necessary, to suit any conceivable training scenario. This creates a high level of disorientation that may be encountered during a mishap, with any type of aircraft or ground vehicle. The overall purpose of this portion of training is learning to identify, control, and counter disorientation, fear/panic, and learn procedures that will successfully allow for a safe egress from a ditched aircraft or ground vehicle. Achieving these goals is highly critical and necessary, when training to build muscle memory that will trigger an automatic reaction/response for a successful exit from a ditched aircraft. The chair of the present disclosure is perfectly suited for this task.

The most important safety feature of the chair of the present disclosure is its uniquely designed Emergency Release System (ERS). The ERS accepts one to five point seat belts/harnesses that can firmly secure/hold any sized student when braced for impact, and immediately release him/her in the event of an emergency and or discomfort. The ERS can be activated from the front or back at any time the instructors feel it is warranted due to student's behavior and movements.

Additional embodiments of the invention may include an emergency release mechanism for releasing the trainee from the interior of the trainer. The release mechanism may be manually operated by the trainee or remotely operated by the instructor. Audio speaker may also be included around the cage to provide audio input. The audio input can be, for example, the sounds associated with a crash, or people calling out, or the sounds of an engine. The purpose of the audio would be to increase the disorientation felt by the trainee and increase the effectiveness of the training.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. An egress trainer for use by an instructor with a trainee, the trainer being movable by the instructor over the ground or upon a body of water, the trainer comprising in combination:
   a cage including a number of interconnected tubes that are removably interconnected with one another, the removability of the tubes permitting the trainer to be disassembled for storage and transport, the cage including forwardmost and rearwardmost ends, and an interior compartment;
   a forward axle at the forwardmost end of the cage and a rearward axle at the rearward most end of the cage;
   a seat within the interior compartment, the seat adapted to support a trainee;
   a harness associated with the seat for securing the trainee to the seat, the harness being selectively releasable by the trainee or the instructor;
   a pair of first wheel pods rotatably secured to the rear axle, the wheel pods being buoyant upon the water and rotatable over the ground;
   a second pair of wheel pods rotatably secured to the forward axle, the wheel pods being buoyant upon the water and rotatable over the ground;
   the position of the wheel pods making the trainer stable upon the water but also allowing the instructor to invert the trainer over the forward or rearward axle.

2. An egress trainer for use by an instructor with a trainee, the trainer being movable by the instructor over the ground or upon a body of water, the trainer comprising in combination:
   a cage including a number of modular components, the modular components including a series of interconnected windows, exits, doors and panels, the cage including forward and reward axles, outer corners, and an interior compartment;
   a seat secured within the interior compartment, the seat adapted to support a trainee;
   a harness associated with the seat and securing the trainee to the seat, the harness being selectively releasable by the trainee or the instructor;
   a pair of first wheel pods rotatably secured to the rear axle, the wheel pods being buoyant upon the water and rotatable over the ground;
   a pair of second wheel pods rotatably secured to the forward axle, the wheel pods being buoyant upon the water and rotatable over the ground;
   the wheel pods being spaced at the outer corners of the cage and thus permitting the instructor to invert the trainer upon the water over the forward or rearward axles and also allowing the instructor to move the trainer over the ground.

3. The egress trainer as described in claim 2 wherein the harness is a five point harness.

4. The egress trainer as described in claim 2 wherein the harness can be remotely released by the instructor.

5. The egress trainer as described in claim 2 further comprising an emergency release system in the form of a mechanical actuator for allowing the instructor to uncouple the trainee from the seat.

* * * * *